May 29, 1962 J. W. JOHNSTONE 3,036,394

APPARATUS AND METHOD FOR MOUNTING RECORD CARD

Filed Oct. 16, 1958 2 Sheets-Sheet 1

INVENTOR.
JACK W. JOHNSTONE

BY R. E. Geauque
Attorney

APPARATUS AND METHOD FOR MOUNTING RECORD CARD
Filed Oct. 16, 1958 2 Sheets-Sheet 2
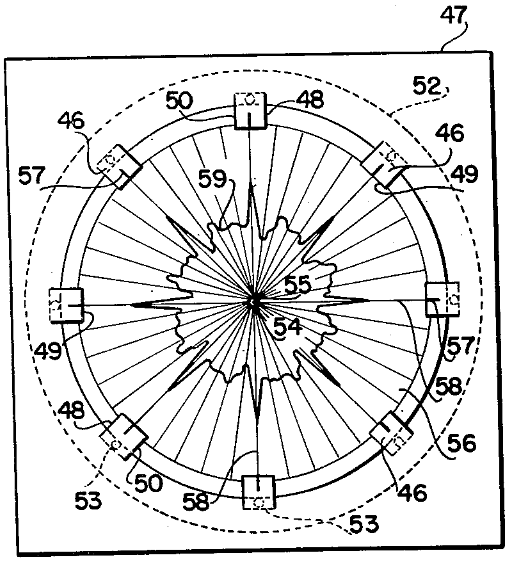
FIG. 8
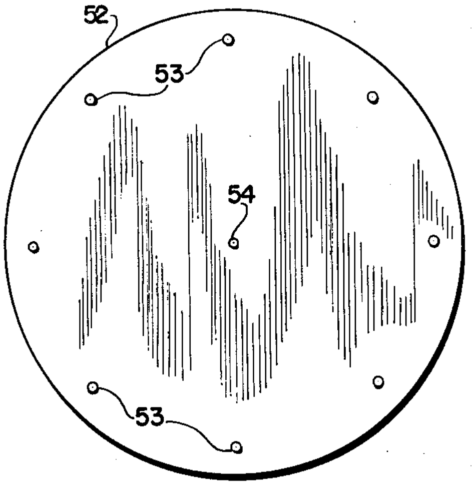
FIG. 7
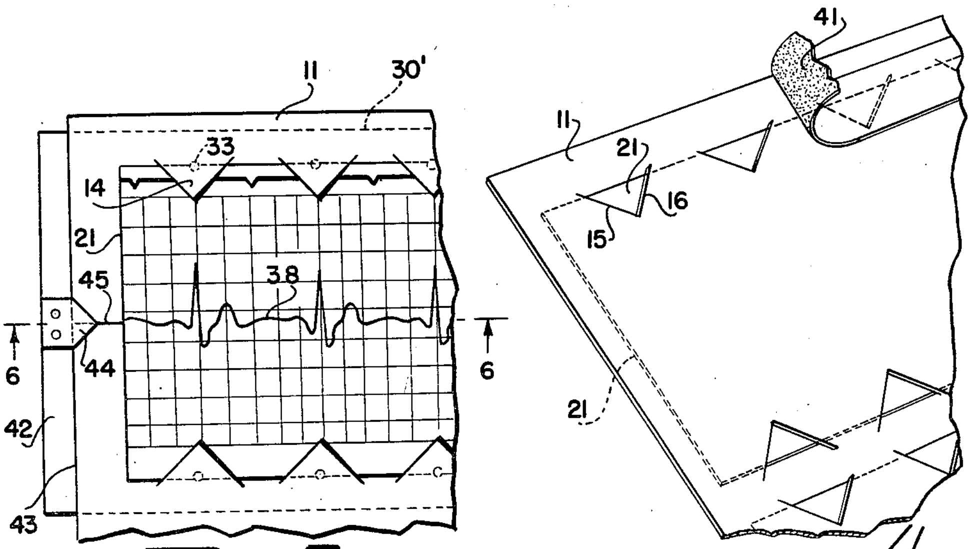
FIG. 5, FIG. 4
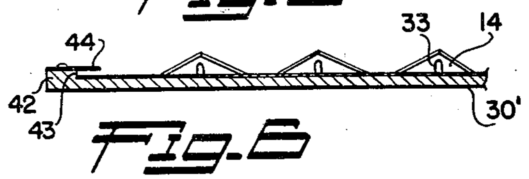
INVENTOR.
JACK W. JOHNSTONE
BY R. E. Geauque
Attorney 3,036,394

APPARATUS AND METHOD FOR MOUNTING RECORD CARD

Jack W. Johnstone, La Canada, Calif., assignor to The Birtcher Corporation, Los Angeles, Calif., a corporation of California
Filed Oct. 16, 1958, Ser. No. 767,619
3 Claims. (Cl. 40—63)

This invention relates to an apparatus and method for mounting record cards and more particularly to a record mounting panel containing a plurality of holding tabs hinged to the panel and a mounting device having a plurality of projections for engaging and moving the holding tabs to permit attachment of the record card.

A type of mounting device presently in use for electrocardiograph records comprises a folder having a plurality of sleeves of various sizes formed by the attachment of a sheet to the inside surface of both the front and back panels of the folder. In order to slide a record card into one of the sleeves, the end of the record is folded over the end of a flat tool which is then inserted into the sleeve along with the record card. After the record card is completely inserted, the flat tool is withdrawn. Such mounting devices requires excessive filing space since the folder, with record cards inserted, comprises six thicknesses of paper. Also, the insertion of the record cards into the sleeves is time consuming and difficult to accomplish. It has also been common practice to clip or staple the record cards to the panels of a folder, but such attachments make it difficult to remove the record cards from the folder.

In the present invention, the front and back panels of such a folder can contain a plurality of holding tabs which are formed in each panel by cut lines. Since the tabs are not completely cut from the panel, the tabs remain hinged to the panel so that they are movable relative to the surface of the panel. The tabs are so arranged in the panel to define a configuration similar to that of the record card which is to be mounted. For mounting rectangular cards, the tabs are arranged in two straight rows with the hinge lines of the tabs in one row being spaced from those in the other row by a distance slightly greater than the width of the record card. Regardless of the shape of the record card, the size of the configuration defined by the hinge lines of the tabs is slightly greater than the dimension of the record card to provide for ease of mounting.

The present invention also provides a master mounting board having a plurality of projections for raising all the tabs involved in the mounting of one record card when the mounting panel is placed over the mounting board. The projections on the board define the same configuration as the tabs used in mounting the record card. In the case of a mounting board utilized to mount rectangular record cards, the two rows of projections are slightly closer together than the hinge lines for the rows of tabs so that the projections will engage the tabs at a position slightly offset from the hinge lines and thereby raise the tabs for insertion of the record card between the rows of tabs. Also, for record cards of other shapes, the projections will be so located to engage the tabs at a point offset from the hinge line.

In one form of the invention, the cut edges of the tabs form an apex overlying the record card mounted on the panel. Generally, most records are related to a time base so that the record cards are divided into graph lines indicating time. By spacing the holding tabs along the record card the proper distance, the apex of the tabs will coincide with the graph lines which designate time intervals, such as seconds or minutes. Thus, the tabs not only serve to hold the record card on the mounting panel but also provide a quick visual indication of time intervals along the record drawn on the card. In some recording mechanisms, a separate record is made on the margin of the card to designate time intervals by sharp peaks in the record. When such a marginal record is present on the record card, the holding tabs are located between the sharp peaks so that the peaks are still visible and both the apexes of the tabs and the peaks designate time intervals of the record.

In mounting a record card on a mounting panel, the panel is placed over the mounting board so that the projections on the board raise the holding tabs when the panel is pushed against the board. For properly locating the board with respect to the tabs, the board contains separate positioning projections which fit snugly into locating holes in the panel. The positioning projections are first placed in the locating holes and the panel is then pushed against the board to raise the tabs and permit insertion of the record card between the tabs. Thereafter, the mounting board is removed and the tabs continue to permanently hold the record card. In place of the use of locating holes, the mounting board can engage the edge of the mounting panel, and index markers on the panel and board can be aligned to properly locate the projections of the board under the holding tabs. With the present invention, the record cards are easily and quickly mounted and an additional thickness of paper is not required or utilized for holding the record card.

It is therefore an object of the present invention to provide an apparatus and method for mounting record cards in which the cards are held by tabs cut from a mounting panel and in which the tabs are raised for mounting of a record card by projections in a master mounting board.

Another object of the invention is to provide a mounting panel having tabs which are raised to receive a record card, said tabs being spaced apart along the record card to designate time intervals of the record on the card.

These and other objects of the invention not specifically set forth above will become readily apparent from the accompanying description and drawings in which:

FIGURE 4 is a partial enlarged perspective view of the back side of a mounting panel of FIGURE 1 showing the manner in which adhesive tape can be applied to permanently attach the record card to a mounting panel;

FIGURE 5 is a partial enlarged plan view similar to FIGURE 1 illustrating a modification for positioning the mounting board;

FIGURE 6 is a sectional view along line 6—6 of FIGURE 5 showing the marker on the mounting board;

FIGURE 7 is a plan view of a modified mounting board for mounting circular record cards; and FIGURE 8 is a plan view of a modified mounting panel for circular record cards illustrating the manner in which the circular card is mounted.

Figures 1, 2, 3:
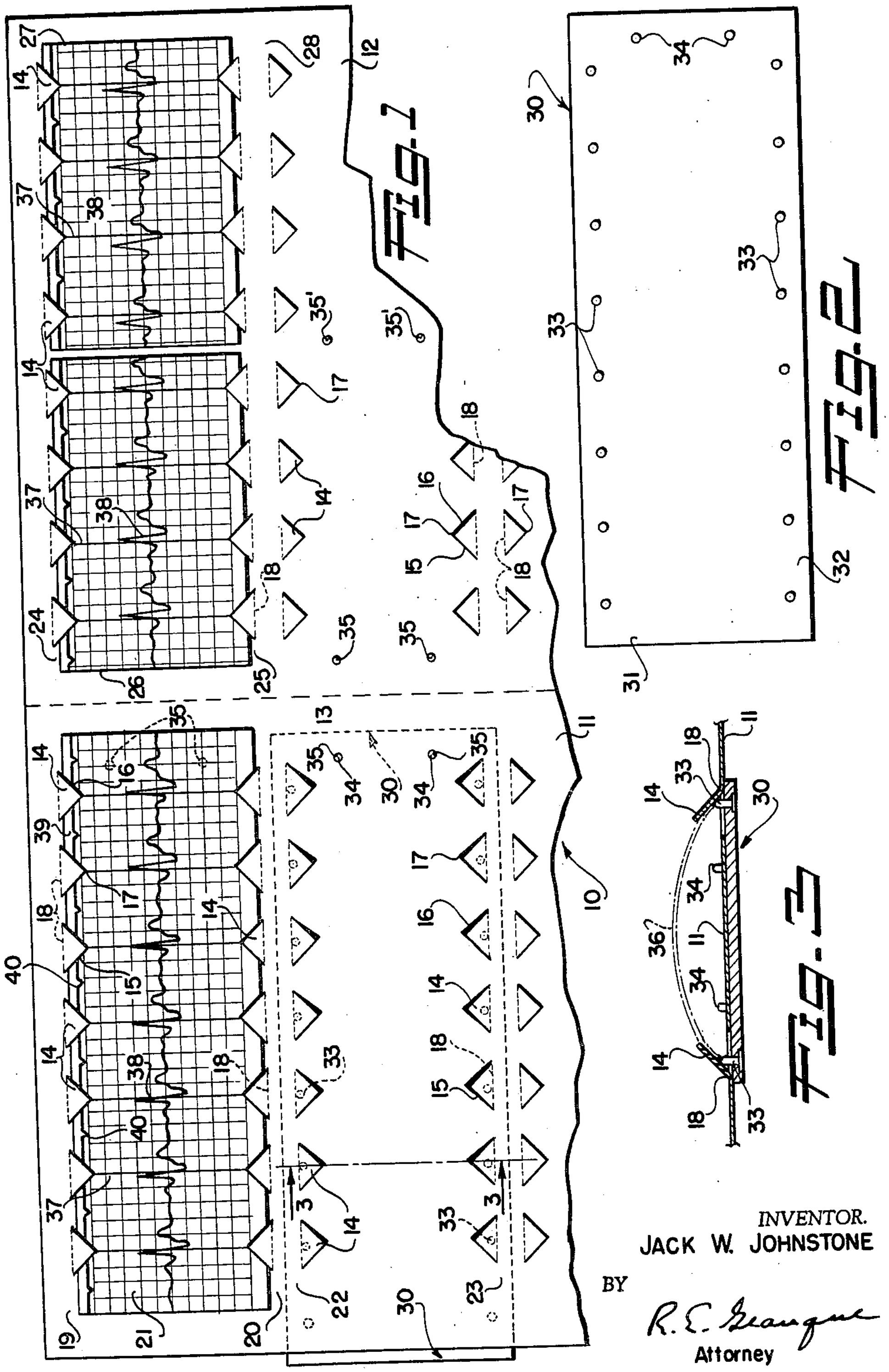
FIGURE 1 is a partial plan view showing the present invention incorporated in the two panels of a common electrocardiograph record folder.
FIGURE 2 is a plan view of the mounting board of the present invention showing the projections for raising the tabs and the end projections for locating the board.
FIGURE 3 is a sectional view along line 3—3 of FIGURE 1 showing the mounting board located under a mounting panel.

For purposes of illustration, the present invention is illustrated in connection with the mounting of electrocardiograph records but it is understood that the invention can be utilized for the mounting of various other record cards of various sizes and shapes. In FIGURE 1, the record folder 10 comprises two mounting panels 11 and 12 which are hinged together along hinge line 13. The mounting panels 11 and 12 contain a plurality of holding tabs 14, each of which are formed by two cut lines 15 and 16 terminating at an apex 17. The cut lines define a triangular shape for the tabs and each tab remains secured to its mounting panel along the side opposite apex 17, said side providing a hinge line 18 about which the tab can move relative to the mounting panel.

The mounting tabs 14 are arranged in rows in each mounting panel and two rows cooperate to hold a single record card. For instance, the tabs forming rows 19 and 20 in panel 11 overlie record card 21 and each row contains seven tabs spaced along the record card. A second record card of the same size can be mounted below card 20 between rows 22 and 23 having the same number of tabs and other cards can be mounted in a similar manner in the remaining part of mounting panel 11. The apex of the tabs in one row of a pair of rows point toward the apex of the tabs in the other row of the pair so that when the tabs are moved above the surface of panel 11, the side edges of the record card are easily inserted under the tabs. Also, the hinge lines of the tabs of row 18 are separated from the hinge lines of the tabs in row 19 by a distance slightly greater than the width of card 21 so that card 21 can be placed flat against panel 11 without its edges binding against the adjacent tabs. In mounting panel 12, rows 24 and 25 each contain eight tabs 14 so that two separate record cards 26 and 27 can be securely mounted between these rows. Similarly, rows 28 and 29 can mount two additional cards of the same size as cards 26 and 27.

A master mounting board 30 is utilized to raise the tabs 14 in a pair of rows to permit mounting of a card. The board 30 is rectangular in shape and has rows 31 and 32 of upstanding projections 33 along each edge. The projections 33 in each row have the same spacing between each other as the tabs 14 in any one of the rows in panels 11 and 12. However, the projections in row 31 are separated from the projections in row 32 by a distance slightly less than the distance between the hinge lines 18 of a pair of tab rows. The board 30 also has a pair of projections 34 at one end which are utilized to properly position the board for mounting a record card. Referring to FIGURE 1, a pair of positioning openings 35 are located in panel 11 between the end of each pair of tab rows and the hinge line 13 and these openings receive pins 34 when board 30 is properly located below panel 11. Also, a pair of openings 35 are located between hinge line 13 and the end of each pair of tab rows in panel 12 and a second pair of positioning openings 35′ are located centrally of panel 12 between each pair of tab rows. The openings 35 in panel 12 receive the locating projection 34 when the small card 26 is being mounted and openings 35′ receive the projections when small card 27 is being mounted. Also, since board 30 contains eight projections 33 in each row, both cards 26 and 27 can be mounted at the same time when projections 34 are located in a pair of openings 35 in panel 12.

In FIGURE 1, the mounting board 30 is located below panel 11 so that the projections 33 engage the tabs 14 of rows 22 and 23 after the projections 34 have been first inserted into openings 35 to properly locate the board for this purpose. Thereafter, pressure applied to the surface of panel 11 will cause the projections 33 to raise all the tabs 14 by moving them about their hinge lines 18. As illustrated in FIGURE 3, each projection 33 engages a tab 14 a short distance inwardly from its hinge line 18 so that maximum movement of each tab is obtained from movement of panel 11 against board 30. After the tabs 14 have been raised, a record card 36 is bent as illustrated in FIGURE 3, so that its side edges can be located below the tabs 14 in rows 22 and 23, and upon removal of the projections 33, the card 36 will be placed flat against the surface of panel 11. Since the width of the card is less than the distance between the hinge lines of these rows, the card will not bind or wedge against the tabs and can be easily removed. While the two projections 33 at the end of board 30 do not engage a tab, these projections do not interfere with the raising of the other tabs. Of course, the end projections will be utilized when the two cards 26 and 27 are mounted at the same time since there are eight tabs in the tab rows of panel 12. Only four of the projections 33 are utilized when card 26 or 27 is mounted separately.

The record cards 21, 26 and 27 contain vertical graph lines 37 which indicate time intervals. The length of the record lines 38 on these cards between every fifth vertical line is equivalent to a second interval of travel of the card through the recording mechanism. The tabs 14 are positioned along the cards so that the apexes 17 coincide with each fifth vertical line 37 and therefore the tabs provide a quick visual indication of second intervals along the record lines drawn on the cards. A separate time record line 39 is also present on the border of the record cards and this record line contains sharp peaks 40 which also designate second intervals of time along the record card. When such a border record is present on a card, the peaks 40 are located between the tabs 14 so that they are not obscured by the tabs and both the peaks and the tabs serve as an indication of time intervals on the record lines. Thus, the tabs 14 serve both as holding means for the record card and as time indicating means. It is understood that the record produced by any recording mechanism can be mounted by the tabs and that the spacing of the tabs is adapted to the particular record card so that the distance between the tabs can represent any desirable interval of time, such as seconds, minutes or hours.

The record cards can be more firmly secured to a mounting panel by utilizing adhesive tape on the back of the panel. As illustrated in FIGURE 4, a strip 41 of adhesive tape is placed on the back of the panel 11 along the row 19 so that the adhesive sticks to both the panel and to the areas of the card 21 located underneath the tabs and between the cut lines 15 and 16. A similar strip of adhesive can also be placed along row 20 in a similar manner if so desired.

A modified mounting board 30′ for properly locating the projections 33 under the rows of tabs is illustrated in FIGURES 5 and 6. The board 30′ has a raised edge portion 42 having a straight surface 43 for engaging the outside end of panel 11. A pointed marker 44 is secured to edge portion 42 in order to overlie panel 11 and the edge of panel 11 has an index mark 45 associated with each pair of rows of holding tabs. The projections 33 are positioned on board 30′ so that they are located under the tabs 14 when the marker 44 is aligned with an index mark 45. Once the board 30′ is so positioned, the record card 21 is mounted in the same manner as with board 30. The projections 33 on board 30′ are spaced slightly inwardly from the tab hinge lines 18 in the same manner as on the board 30, in order to raise the tabs.

A modification of the invention for mounting circular record cards is illustrated in FIGURES 7 and 8. A plurality of holding tabs 46 are formed in mounting panel 47 by cut lines 48, 49 and 50. The side of each tab opposite cut lines 49 forms a hinge line 51 with the panel 47 about which the tab can be moved. A circular mounting board 52 has a plurality of projections 53, similar to projections 33, arranged in a circle around the board and a locating projection 54 is positioned at the center of the circle. The projections 53 are equally spaced apart so as to engage each of the tabs 46 inwardly from hinge lines 51 when the locating projection 54 is inserted in positioning hole 55 in panel 47. With the projections 53 thus located, the tabs 46 are raised by pushing on the mounting panel 47 so that the edge of circular record card 51 can be inserted underneath the tabs. As in the previous embodiment, the record card 56 is slightly less in diameter than the circle defined by hinge lines 51 so that the record card will not bind against the tabs 46.

Since the tabs 46 are rectangular in shape, an index mark 57 is applied to each tab and these marks are aligned with radial graph lines 58 of the record card which indicate equal time intervals around the card. Therefore, the tabs 46 provide a quick visual indication of the time intervals on the record line 59. It is understood that the tabs 46 could be of the same shape as tabs 14 to eliminate the need for the index marks 57.

The present invention provides a means and method of quickly mounting record cards on a panel of single thickness so that minimum file space is consumed by the record card and mounting panel. In addition to holding the record cards, the holding tabs perform the function of indicating time intervals on any record which moves at given rate under any type of recording mechanism. The mounting board can be constructed of any suitable material, such as plastic, and the projections on the mounting board can be formed integrally with the board or attached thereto by any suitable connection. Various other modifications of the invention are contemplated by those skilled in the art without departing from the spirit and scope of the invention as hereinafter defined by the appended claims.

What is claimed is:

1. A record comprising, in combination: a record card having edges, transverse indicia positioned on said card at predetermined spaced distances from one another, a mounting panel for said card, a plurality of cut lines in said panel forming a plurality of individual holding tabs for holding the record card in juxtaposition to said panel, each of said tabs being hinged at one end to said panel along an uncut hinge line and movable away from the surface of said panel, the hinge lines of said tabs being arranged in a predetermined configuration which is complementary to selective edges of the record card with said tabs projecting inwardly of said configuration to position the edges of the record card adjacent said panel with said tabs overlying the card, said tabs being spaced apart a predetermined distance equal to the spaced indicia of the record card, and indicating means on each of said tabs and alignable with the indicia of the record card while mounting the card so as to predetermine the position of the record card relative to said panel.

2. A record comprising, in combination: a rectangular shaped record card having edges, indicia positioned on said card at predetermined spaced distances transverse to at least one of said edges, a mounting panel for said card, a plurality of cut lines in said panel forming a plurality of individual holding tabs for holding the record card in juxtaposition to said panel, each of said tabs being hinged at one side of said panel along an uncut hinge line and movable away from the surface of said panel, said hinge lines of said tabs being arranged in a pair of substantially parallel, straight rows separated from one another by a distance substantially equal to the width of the record card and the tabs in each row extending towards one another to position opposed edges of the record card adjacent to said panel with said tabs overlying the edges, said tabs being spaced apart a predetermined distance equal to the spaced indicia of the record card, and indicating means on each of said tab means and alignable with the indicia of the record card while mounting the card so as to predetermine the position of the record card relative to said panel.

3. The combination of claim 1 wherein said predetermined spaced distances are each substantially equal one to another.

References Cited in the file of this patent

UNITED STATES PATENTS

| | | |
|---|---|---|
| 2,016,176 | Rand | Oct. 1, 1935 |
| 2,218,305 | Ainsworth | Oct. 15, 1940 |
| 2,747,894 | Porter | May 29, 1956 |
| 2,886,040 | Raach | May 12, 1959 |

FOREIGN PATENTS

| | | |
|---|---|---|
| 378,283 | Germany | Jan. 3, 1924 |